United States Patent

[11] 3,597,624

[72] Inventor Daniel Weiner
    Hazlet, N.J.
[21] Appl. No. 795,311
[22] Filed Jan. 30, 1969
[45] Patented Aug. 3, 1971
[73] Assignee Bell Telephone Laboratories, Incorporated
    Murray Hill, N.J.

[54] OPTICAL RAMAN OSCILLATOR EMPLOYING COLLOIDAL SUSPENSION OR EMULSION
4 Claims, 3 Drawing Figs.

[52] U.S. Cl. .................................................. 307/88.3,
                                                  321/69, 331/94.5
[51] Int. Cl. ...................................................... H03f 7/20

[50] Field of Search .......................................... 307/88.3;
                                                  321/69; 331/94.5

Primary Examiner—John Kominski
Assistant Examiner—Darwin R. Hostetter
Attorneys—R. J. Guenther and Arthur J. Torsiglieri ABSTRACT: A coherent optical Raman oscillator is disclosed in which the tendency to filament formation is reduced without proportionally impairing stimulated Raman scattering strength by employing a colloidal suspension or emulsion of Raman-active particles in an inactive medium or of colloidal-size inactive particles in a Raman-active medium. Other bodies of size smaller than a wavelength of Raman-scattered light may also be used.

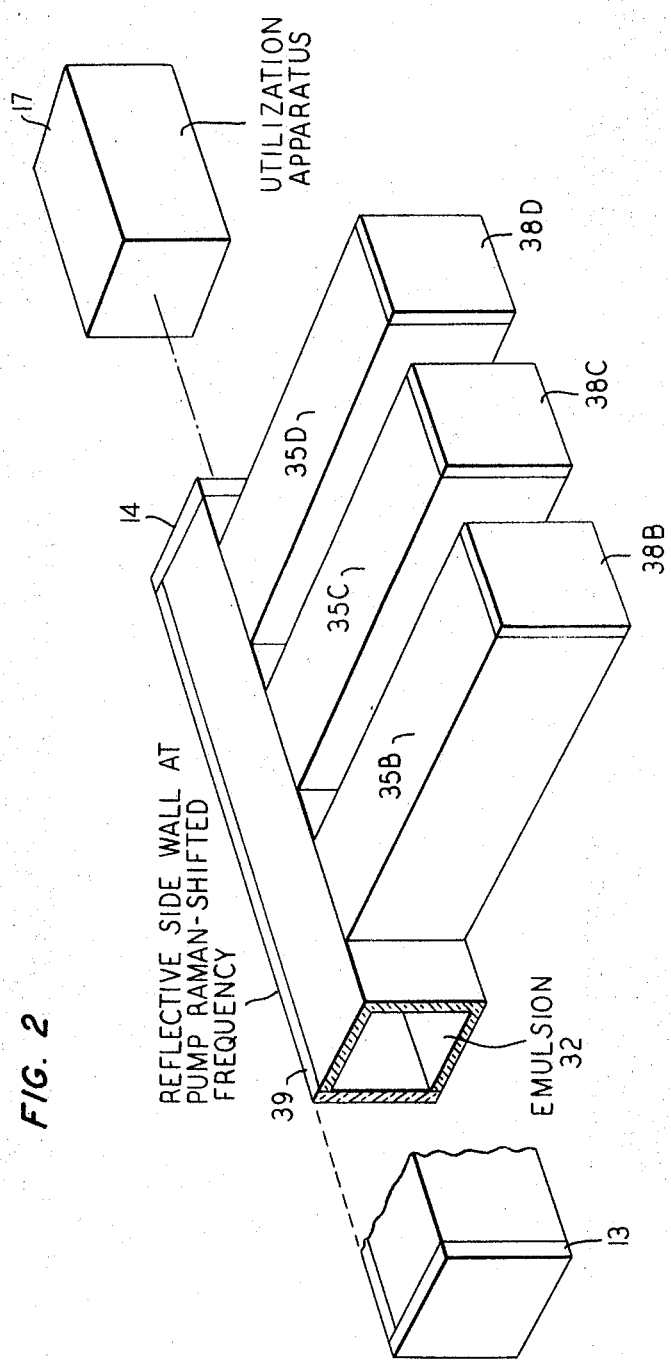

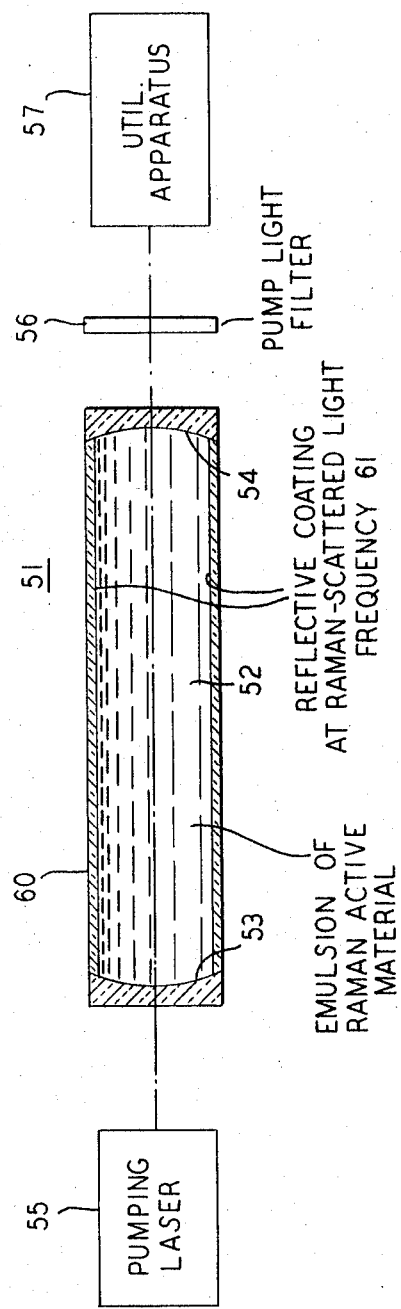

3,597,624

OPTICAL RAMAN OSCILLATOR EMPLOYING COLLOIDAL SUSPENSION OR EMULSION

BACKGROUND OF THE INVENTION

This invention relates to optical Raman oscillators and amplifiers.

A Raman oscillator is an oscillator in which an interatomic lattice resonance or electronic resonance of a suitable medium inelastically interacts with a pumping radiation and produces an output Raman-scattered radiation that is shifted in frequency from the pumping radiation. A resonance, as used herein, is a capability of the medium to support a particular frequency of vibration much more strongly that other slightly greater or smaller frequencies of vibration. Many materials exhibit a large number of lattice or electronic resonances characterized by the inelastic interaction pumping radiation. These materials are said to be Raman-active materials or media.

Those Raman-active media which will interact strongly with a coherent optical pumping radiation are currently of great interest because of their possible usefulness in communications and in investigating the properties of other materials. This usefulness stems in part from the relatively broad output frequency spectrum that becomes possible because each such medium typically has a number of suitable resonances at closely spaced frequencies, called Raman-active lines. In addition, it is recognized that, if the Raman-scattered radiation becomes strong enough, it will stimulate strong additional Raman scattering; and all of the Raman scattering will become synchronized or in the same phase. This stimulated radiation is coherent. Indeed, the greatest interest is shown in the discovery and development of coherent optical Raman oscillators. Such a device employed with a gain below the oscillation threshold is useful as an amplifier of input radiation at the frequency of the Raman-scattered radiation.

Nevertheless, a persistent problem of such devices developed to date is that coherent intense radiation beams in Raman-active materials tend to break up into filaments as small as a few microns in diameter. (One micron equals $10^{14}$ centimeters.) An approximate partial explanation appears to be that the presence of intense light in some regions causes the index of refraction to increase in those regions. Light is then bent in the direction of increasing index of refraction. The effect is accentuated until light is forced into thin filamentary regions. Necessary for this effect are thus the sharp boundaries between high and low index regions.

This filament formation destroys the overall beam coherence needed for many applications, such as deep-space communication using high power Raman lasers.

SUMMARY OF THE INVENTION

According to my invention, I have recognized that the filament formation is advantageously counteracted by forming a suspension or emulsion including the Raman-active medium and an inactive medium. An inactive medium is one which is not Raman-active and does not tend to focus light. The bodies in the suspension or emulsion are smaller than he pumping or Raman-scattered radiation wavelengths. Formation of beam filaments is impeded because the Raman-scattered light no longer can encounter fully developed boundaries between high and low index material, which causes the "self-focusing" described above. Moreover, a filament cannot form within a single colloidal-size particle, since a single such particle is too small to support the filament. Also, Raman-scattered light from a given region of Raman-active material, if it is somewhat concentrated, tends to spread in a following region of inactive material. The overall effect is to homogenize the beam during the stimulated emission process. Scattering loss is also reduced by the small size of the suspended bodies and by matching the indices of refraction of the active and inactive media.

According to one aspect of my invention, a coherent optical Raman device may employ an emulsion of two liquids, one of which is Raman-active and the other of which is inactive, or may employ colloidal particles of a solid medium suspended in a liquid or gel. The solid may either be Raman-active or inactive, and the liquid or gel is the opposite.

Advantageously, loss of the Raman-scattered light through the side walls of the device may be reduced by employing reflective side walls.

BRIEF DESCRIPTION OF THE DRAWING

Further features and advantages of my invention may be obtained from the following detailed description, taken together with the drawing, in which:

FIG. 2 is a partially pictorial and partially block diagrammatic illustration of a second embodiment of the invention; and FIG. 3 is a partially pictorial and partially block diagrammatic illustration of an end-pumped embodiment employing reflective sidewalls.

DESCRIPTION OF ILLUSTRATIVE EMBODIMENTS

Figure 1:
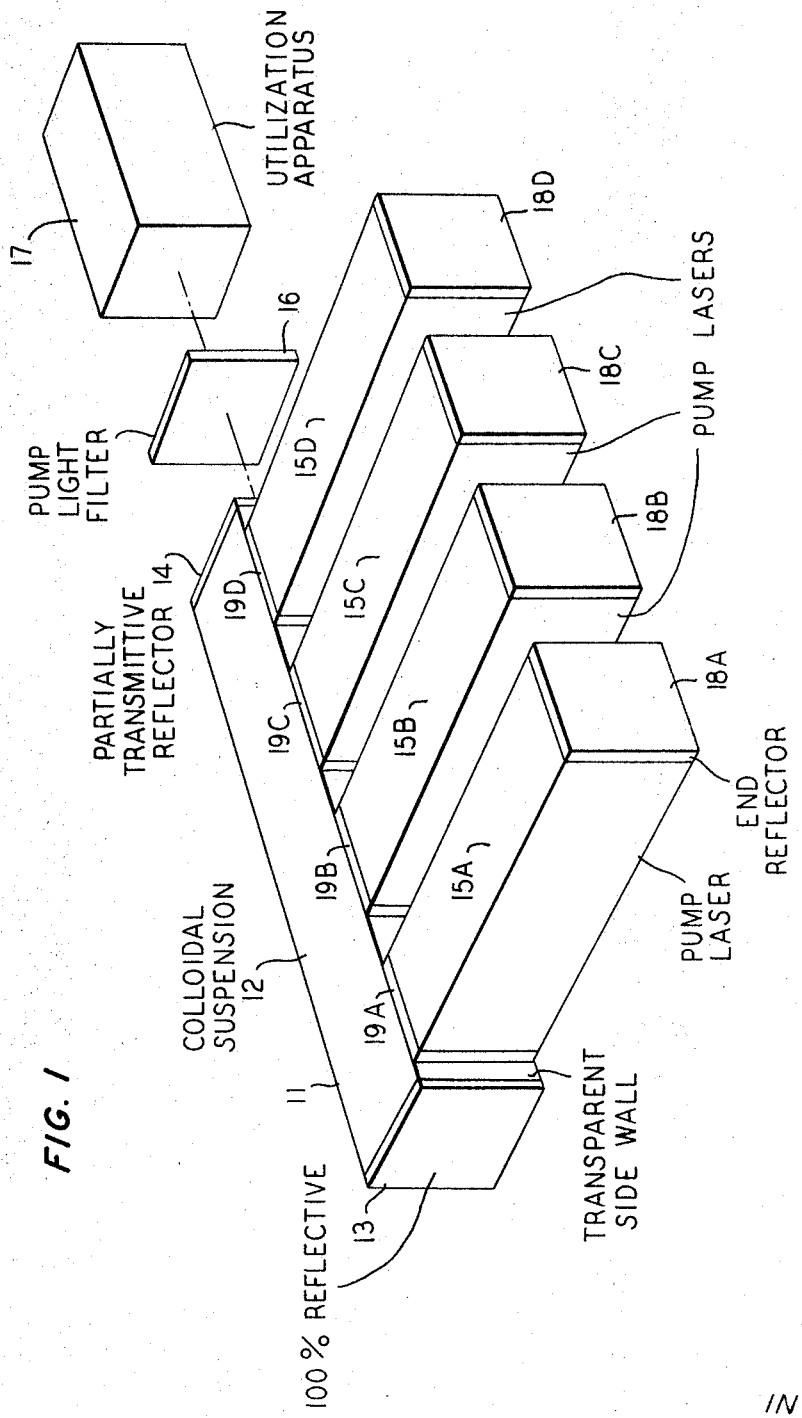
FIG. 1 is a partially pictorial and partially block diagrammatic illustration of a preferred embodiment of the invention employing an emulsion.

In FIG. 1, a coherent optical Raman oscillator employs a suspension-filled glass-walled cell 11 of which the ends are formed by reflectors 13 and 14, which form an optical resonator for the frequency, hereinafter called the Raman-shifted frequency, of the Raman-scattered radiation. Cell 11 is 1 meter long and has a 1 centimeter square cross section. Reflector 13 is preferably 100 percent reflective; and reflector 14 is illustratively of the order of 50 percent reflective and 50 percent transmissive. It could also be substantially less reflective.

Pumping lasers 15A—15D are giant-pulse lasers disposed to direct the pumping radiation through a transparent side wall of cell 11; and a filter 16 for removing side-scattered pumping radiation from the output beam is disposed between reflector 14 and utilization apparatus 17, which may illustratively be an optical modulator in an optical communication, e.g., pulse-code-modulation, system. The lasers are energized and controlled by conventional giant-pulse techniques by apparatus not shown. Each pump laser has its one end reflector 19A—19D coupling a fraction of its coherent light through a transparent side wall of cell 11.

The suspension 12 in cell 11 is illustratively nitrobenzene (Raman-active) suspending particles, less than 1,000A. diameter, of substantially index-matched barium-flint glass (which is much more optically linear than nitrobenzene and, thus, is inactive). Approximately equal parts of each are used. A slight mismatch of index of refraction between the glass and nitrobenzene may be reduced by mixing the nitrobenzene with a small proportion of acetone or carbon disulfide. The particles can be formed by burning silicon in the presence of suitable impurities to form a smoke, or by chopping finely drawn (1000A.) fibers.

Illustratively, the pumping lasers are giant-pulse 6943A. ruby lasers with relatively high spectral purity to avoid stimulated Brillouin scattering. Each supplies 10 joules in $10^{17}$ seconds. For this wavelength and the above-described emulsion bodies, the filament-forming tendency of the 7660A. Raman-scattered light will be effectively counteracted. Preferably, the pump power intensity is $10^8$ watts per square centimeter. While four pump lasers are illustrated, 100 pump lasers would be used for a cell 11 1 meter long.

To describe the operation, let us discuss a selected Raman-shifted frequency of about 7660A., which can be obtained in nitrobenzene with the 6,943A. pumping light. My calculations show that for the given parameters the Raman gain per pass is of the order of 1000.

The scattering loss due to the colloidal particles is approximately 1 percent per centimeter if the difference between the indices of refraction of the nitrobenzene and glass is about 0.005, although better index matches are easily achieved simultaneously at the pump frequency and Raman-shifted frequency.

The absorption length of the pump light in cell 11 is several meters, so that heating effects should not significantly change the indices of refraction. Also, the absorption loss for the Raman-shifted radiation is less than 1 percent per centimeter.

The resulting net gain is more than sufficient for oscillation at the Raman-shifted frequency.

My calculations show that the combination of effects discussed in the summary above tends to counteract filament formation.

Filling factors from 10 percent to 90 percent of the Raman-active medium are feasible, with corresponding changes in reflectivity of reflector 14 or pumping intensity to maintain oscillations.

It should be noted that divergence or spreading of the pump beams is not harmful and may actually be helpful in counteracting filament formation.

In the second embodiment of FIG. 2, the cell 31, providing advantages similar to those of cell 11 in FIG. 1, is placed within the pump resonators.

Side wall 39 is reflective at the pump frequency and forms one end reflector of the pump lasers 35B—35D, etc. The resonator mirrors 13 and 14 are like mirrors 13 and 14 of FIG. 1. The other sidewalls are transparent at both pump and Raman-shifted frequencies.

Assuming an emulsion 32 in FIG. 2 of benzene in water (proportions about 50 percent–50 percent by volume), in which the benzene bodies are about 100A. in diameter, oscillation at the Raman-shifted frequency can be obtained by disposing the emulsion within the ruby pump resonators. The emulsion can be formed by beating the benzene and water together or by ultrasonic agitation. Filament formation is counteracted.

An end-pumped embodiment of my invention is shown in FIG. 3, in which components analogous to those of FIG. 1 are numbered forty digits higher. The glass-walled cell 51 is provided with an internal coating 61 that is reflective at the Raman-shifted frequency to reduce scattered light loss. Otherwise, the embodiment and its operation is similar to that of the preceding embodiments.

Among the many possible variations of the embodiments of my invention are the following. The particle size can vary about one order of magnitude in either direction from those disclosed in the preferred embodiments. The smaller particles permit a larger difference in index of refraction of the active and inactive media, but are harder to make. Larger particles tend to be relatively more effective in suppressing filament formation by providing larger interparticle distances for a given filling factor. Matching is mainly of interest for the Raman-shifted frequency.

The filling factor of active to inactive medium can vary through wide ranges if other parameters, such as pump intensity and resonator Q, are adjusted appropriately. The combinations of active and inactive media can include a liquid in a liquid, a solid in a liquid and a solid in a solid, e.g., a gel. The suspended bodies may be either Raman-active or inactive. Other techniques for providing bodies with lateral dimensions smaller than a wavelength include filaments, short rods, thin laminae extending transverse to the axis of the resonator at the Raman-shifted frequencies, and other bodies in which the small dimension, less than a wavelength of the Raman-shifted light, extends either transverse or parallel to the direction of propagation of the Raman-shifted light. Also, porous bodies of one medium can be filled with the other medium by capillary action. It can be seen that some agglomeration of particles in the particulate embodiments is not a significant disadvantage. Side-pumping can be implemented from all directions around the resonator axis. In a given embodiment, this principle is limited only by required spacings of the pumping lasers.

Undesired anti-Stokes radiation can be eliminated by selective absorption within the resonator or by index mismatch at the anti-Stokes frequency.

Solid Raman-active materials which are attractive are lithium niobate and other nonlinear solids. Solids can be suitably finely divided, e.g., pulverized or ground, and ultra-centrifuged to select the appropriate size.

In addition, many dielectric or paramagnetic solids can be oriented in electric and magnetic fields respectively, which may be advantageous to reduce unwanted scattering from the particles and improve Raman gain.

Harmful stimulated Brillouin scattering may be suppressed because associated heating may cause index mismatch between the colloidal bodies and the other medium, thereby interrupting the Brillouin process.

I claim:

1. A coherent optical device comprising a Raman-active medium capable of providing gain for a first radiation Raman-shifted in frequency from a pumping radiation, said medium being characterized by a tendency to form filaments of said first radiation, a second medium of inactive material, one of said media supporting bodies of the other of said media having a lateral dimension smaller than a wavelength of said first radiation, and means for supplying to said bodies and the one of said media a beam of coherent pumping radiation to provide said gain, whereby said bodies in the one of said media counteract said tendency to form filaments.

2. A coherent optical device according to claim 1 including means for resonating said first radiation to stimulate said first radiation and produce oscillation at said Raman-shifted frequency.

3. A coherent optical device according to claim 1 in which the Raman-active medium is a Raman-active liquid, and the second medium is an inactive liquid, said liquids being combined in an emulsion, said device including a container for said emulsion.

4. A coherent optical device according to claim 1 including means for resonating the first radiation stimulate said first radiation and produce oscillation at said Raman-shifted frequency, the container having side walls that are substantially reflective at the Raman-shifted frequency.